(12) United States Patent
Braunstein et al.

(10) Patent No.: US 11,568,277 B2
(45) Date of Patent: Jan. 31, 2023

(54) METHOD AND APPARATUS FOR DETECTING ANOMALIES IN MISSION CRITICAL ENVIRONMENTS USING WORD REPRESENTATION LEARNING

(71) Applicant: imVision Software Technologies Ltd., Ramat Gan (IL)

(72) Inventors: Liora Braunstein, Tel Aviv (IL); Keren Cohavi, Tel-Aviv (IL); Yoav Spector, Ramat Gan (IL)

(73) Assignee: Intuit Inc., Mountain View, CA (US)

( * ) Notice: Subject to any disclaimer, the term of this patent is extended or adjusted under 35 U.S.C. 154(b) by 65 days.

(21) Appl. No.: 16/715,504

(22) Filed: Dec. 16, 2019

(65) Prior Publication Data
US 2020/0193305 A1   Jun. 18, 2020

Related U.S. Application Data

(60) Provisional application No. 62/780,275, filed on Dec. 16, 2018.

(51) Int. Cl.
*G06F 17/00* (2019.01)
*G06N 5/02* (2006.01)
(Continued)

(52) U.S. Cl.
CPC ........... *G06N 5/025* (2013.01); *G06F 40/205* (2020.01); *G06K 9/6245* (2013.01); *G06V 30/413* (2022.01); *G06V 30/414* (2022.01)

(58) Field of Classification Search
CPC .... G06N 5/025; G06N 20/00; G06K 9/00456; G06K 9/6245; G06K 9/00463; G06K 9/6232; G06F 40/205
See application file for complete search history.

(56) References Cited

U.S. PATENT DOCUMENTS

2011/0167493 A1* 7/2011 Song ................... H04L 63/1466
726/23
2012/0137367 A1* 5/2012 Dupont .................. G06F 21/00
726/25
(Continued)

OTHER PUBLICATIONS

Yoon, Man-Ki, and Gabriela F. Ciocarlie. "Communication pattern monitoring: Improving the utility of anomaly detection for industrial control systems." NDSS workshop on security of emerging networking technologies. 2014 (Year: 2014).*
(Continued)

*Primary Examiner* — Andrew T McIntosh
(74) *Attorney, Agent, or Firm* — Ferguson Braswell Fraser Kubasta PC

(57) ABSTRACT

A method and system for detecting anomalies in mission-critical environments using word representation learning are provided. The method includes parsing at least one received data set into a text structure; isolating a protocol language of the at least one received data set, wherein the protocol language is a standardized pattern for communication over at least one communication protocol; generating at least one document from the contents of the received at least one data set, wherein the at least one document includes at least one parsed text structure referencing a unique identifier; detecting insights in the at least one generated document, wherein insights are detected in at least one representation having at least one dimension, wherein the representation is mapped to at least one learned hyperspace; extracting rules from the detected insights; and detecting anomalies by applying the extracted rules on patterns for communication over at least one communication protocol.

19 Claims, 8 Drawing Sheets

(51) Int. Cl.
    *G06F 40/205*     (2020.01)
    *G06K 9/62*     (2022.01)
    *G06V 30/413*     (2022.01)
    *G06V 30/414*     (2022.01)

(56) References Cited

U.S. PATENT DOCUMENTS

| | | | | |
|---|---|---|---|---|
| 2014/0298460 | A1* | 10/2014 | Xue | H04L 63/1425 |
| | | | | 726/23 |
| 2020/0125928 | A1* | 4/2020 | Doyle | G06N 3/0472 |

OTHER PUBLICATIONS

Valdes, Alfonso, and Steven Cheung. "Communication pattern anomaly detection in process control systems." 2009 IEEE Conference on Technologies for Homeland Security. IEEE, 2009 (Year: 2009).*

Wressnegger, Christian, Ansgar Kellner, and Konrad Rieck. "Zoe: Content-based anomaly detection for industrial control systems." 2018 48th Annual IEEE/IFIP International Conference on Dependable Systems and Networks (DSN). IEEE, 2018 (Year: 2018).*

Camacho-Collados, et al., "From Word to Sense Embeddings: A Survey on Vector Representations of Meaning," United Kingdom, 2018, pp. 1-40.

Fajardo, et al., "Diameter Base Protocol," Internet Engineering Task Force (IE TF), pp. 1-152, 2012.

\* cited by examiner

METHOD AND APPARATUS FOR DETECTING ANOMALIES IN MISSION CRITICAL ENVIRONMENTS USING WORD REPRESENTATION LEARNING

CROSS-REFERENCE TO RELATED APPLICATIONS

This application claims the benefit of U.S. Provisional Application No. 62/780,275 filed on Dec. 16, 2018, the contents of which are hereby incorporated by reference.

TECHNICAL FIELD

The present disclosure relates to techniques for detecting anomalies in mission critical environments, including API implementations, and, more particularly, to techniques for detecting anomalies in communication networks, utilizing word representation learning.

BACKGROUND

Machine-to-machine communication is widespread over many systems, environments, and disciplines. Financial and banking systems, applying transactions and services, industrial (SCADA) environments, where different machines communicate with each other, communication networks, telecommunication networks, and other systems, each implement machine-to-machine communication via unique configurations and for unique purposes.

Machine-to-machine communication may also be implemented using Application Programming Interfaces (APIs). APIs allow for the development of software compatible with existing systems by standardizing the resources, functions, and other development elements available to programmers. By distributing an API, a software developer can expand the potential uses of an application to include integration with other applications. An example of an API application is a software interface provided by a weather forecasting organization which allows web developers to include a weather module, maintained by the weather forecasting organization, in a website.

Many environments including, without limitation, financial systems, are mission-critical environments. Ensuring correct continuing operation of such systems is as much a part of employing such systems as is the initial implementation. In such environments, anomalies may be classified into two major categories: operational and intentional. Operational anomalies occur due to malfunctions or failures in certain elements of a system, bugs, and so on. Intentional anomalies are usually caused by cyberattacks. As anomalies may imply substantial impact in mission-critical environments, detecting anomalies, preferably in real-time, is crucial to the success of continued operations.

Solutions to anomaly-detection problems in mission-critical environments employing network language processing (NeLP) may be found in the related art. The application of NeLP methods to anomaly detection first requires consideration of an exchange between machines as a "conversation," conducted in a "language" known to the machines. In such a case, specifically, the communication protocol over which the machines communicate, or the channel and protocols standardized by an API, is the "language". To further the goal of solving anomaly-detection problems using NeLP, tools from the natural language processing (NLP) discipline can be applicable to detect anomalies in mission critical environments and to increase the system's detection rate and to reduce its false alarm rate.

Anomaly detection techniques may also be applied to improve the security of API implementations. As the percentage of web-enabled applications containing exposed APIs increases, the amount of API surface area vulnerable to attack is expected to increase as well. Current API security techniques include the manual patching of bugs and backdoors. This technique requires significant time and effort, as bugs and backdoors must be identified, fixes must be created, and those fixes must be pushed to an API update. Furthermore, as client software may depend on one particular version of an API, altering the structure or resources of the API may cause discontinuities in client application availability.

Two major measures are used to indicate the quality of an anomaly detection system, the false alarm rate, the number of times an anomaly detection mechanism indicates an anomaly, where in reality the tested system performs well, divided by the total number of anomaly indications, and the miss detection rate, the ratio between the number of times anomalies were missed by the detection mechanism and the total numbers of anomalies that occurred. The target is, of course, to minimize these two numbers.

Word Representation Learning (also known as Vector Space Model) is a central task in Natural Language Processing. It aims to embed words into low-dimensional vectors, so that a word is generally represented as a point in a vector space. A common paradigm for acquiring these representations is based on the distributional hypothesis of words in natural text, stating that words that appear in similar contexts have similar meanings.

Some approaches for creating word representation make direct use of the frequencies of the co-occurring words in a corpus, while more recent works make use of Neural Networks to directly learn low-dimensional representations. The effectiveness of word representation methods in capturing syntactic and semantic information have made them very useful for a wide range of NLP applications, such as syntactic parsing, text classification, and question answering It would therefore be advantageous to provide anomalies detection solutions for mission critical networks and especially telecommunications networks.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for detecting anomalies in mission-critical environments using word representation learning are provided. The method includes parsing at least one received data set into a text structure; isolating a protocol language of the at least one received data set, wherein the protocol language is a standardized pattern for communication over at least one communication protocol; generating at least one document from the contents of the received at least one data set, wherein the at least one document includes at least one parsed text structure referencing a unique identifier; detecting insights in the at least one generated document, wherein insights are detected in at least one representation having at least one dimension, wherein the representation is mapped to at least one learned hyperspace; extracting rules from the detected insights; and detecting anomalies by applying the extracted rules on patterns for communication over at least one communication protocol.

Certain embodiments disclosed herein also include a system for detecting anomalies in mission-critical environments using word representation learning. The system includes a processing circuitry; and a memory, the memory containing instructions that, when executed by the processing circuitry, configure the system to: parse at least one received data set into a text structure; isolate a protocol language of the at least one received data set, wherein the protocol language is a standardized pattern for communication over at least one communication protocol; generate at least one document from the contents of the received at least one data set, wherein the at least one document includes at least one parsed text structure referencing a unique identifier; detect insights in the at least one generated document, wherein insights are detected in at least one representation having at least one dimension, wherein the representation is mapped to at least one learned hyperspace; extract rules from the detected insights; and detect anomalies by applying the extracted rules on patterns for communication over at least one communication protocol.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

A summary of several example embodiments of the disclosure follows. This summary is provided for the convenience of the reader to provide a basic understanding of such embodiments and does not wholly define the breadth of the disclosure. This summary is not an extensive overview of all contemplated embodiments and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Figure 1:
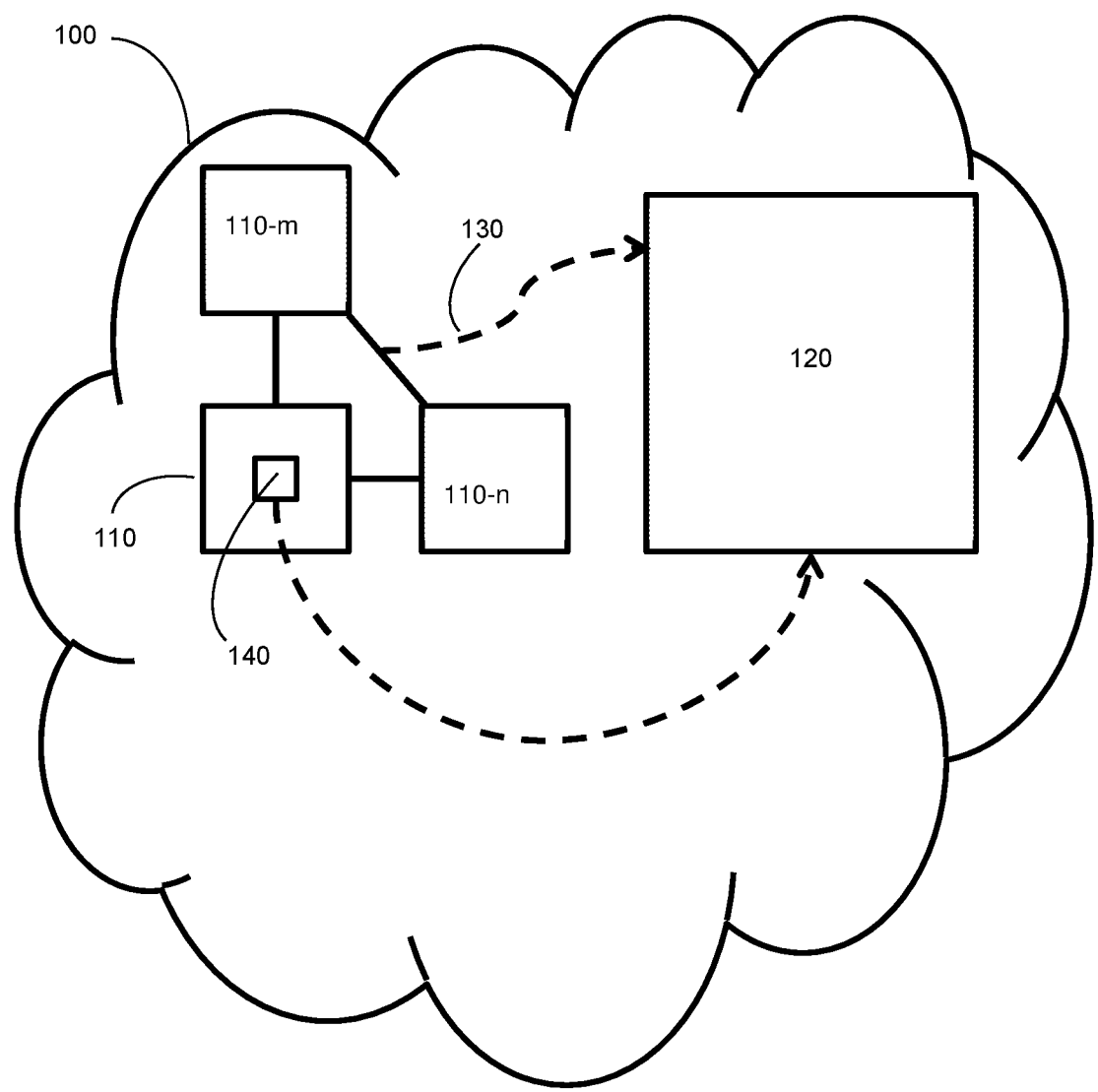
FIG. 1 is an example diagram illustrating a mission-critical network, and is utilized to describe the various embodiments.

FIG. 1 is an example diagram illustrating a mission-critical network 100 and is utilized to describe the various embodiments. In an embodiment, the mission critical-network 100 may be configured to include at least two machines, 110 through 110-*n*, communicating with one another via a protocol including, without limitation, industrial machine communication protocols, mobile device communication protocols, wired communication protocols, and the like. Further, the mission-critical network 100 may be configured such that the at least two machines 110 communicate with one another via applications based on an API using the communication channels and methods standardized by the API. The network 100 may include, for example, a financial and banking network, an industrial (e.g., SCADA) network, a telecommunication network, and the like.

The network 100 may be further configured to include an analytic system 120 configured to receive information regarding the API, APIs, or communication protocol or protocols employed by the machines 110 and to extract information related to data exchanged between the machines 110. A machine 110 may be any server in the network 100. The application of anomaly-detection techniques in such a system including API transactions may enable the detection and mitigation of API-specific cyberattacks. As an example, an attacker may exploit an API by manipulating the API to bypass a credentials verification step, allowing the attacker to access sensitive information using valid credentials, but without verifying his or her identity.

In an embodiment, the analytic system 120 may be configured to receive and analyze communications between two or more machines 110 by "tapping" or intercepting 130 a communication connection between the machines 110.

The "tap" may be a stalling intercept process, wherein the communication between the machines 110 is paused for the duration of analysis. The "tap" may also be a duplicative process, wherein the communication between the machines 110 is duplicated and the duplicate communication is analyzed, allowing the original communication to proceed from node to node during analysis. The "tapping" or interception of a communication connection between the machines 110 provides for the real-time analysis of individual communicative elements, allowing the analytic system 120 to receive data, analyze content and context, and develop new rules on a persistent basis.

In an embodiment, the analytic system 120 may be configured to receive and analyze communications by receiving a block of aggregated data packets from a plug-in 140 installed in each machine 110. In an embodiment, the plug-in 140 may be configured to log communication data to and from the machine 110 in which the plug-in 140 is installed. Such data includes contents of logged communication packets and context information, such as the order of communication, the delay between communications, and the like. The plug-in 140 may be realized in software, firmware, hardware, or combination thereof.

In an embodiment, each plug-in 140 may be configured to transmit logged communication information to the analytic system 120 at various intervals based on factors. Such factors may include, without limitation, time-intervals, communication counts, communication content or context triggers, and the like. The batching of communication information provides for a standardized procedure for collecting, transmitting, and receiving communication data for analysis, allowing the analytic system 120 to better manage analytic resources and to schedule analytic tasks. Further, the batching of communication information provides for large datasets, which may allow the generation of refined rules based on the extraction of patterns supported by volumes of data.

In an embodiment, the analytic system 120 may be configured to generate anomaly-detection events based on patterns extracted from the received content and context data.

Figure 2:
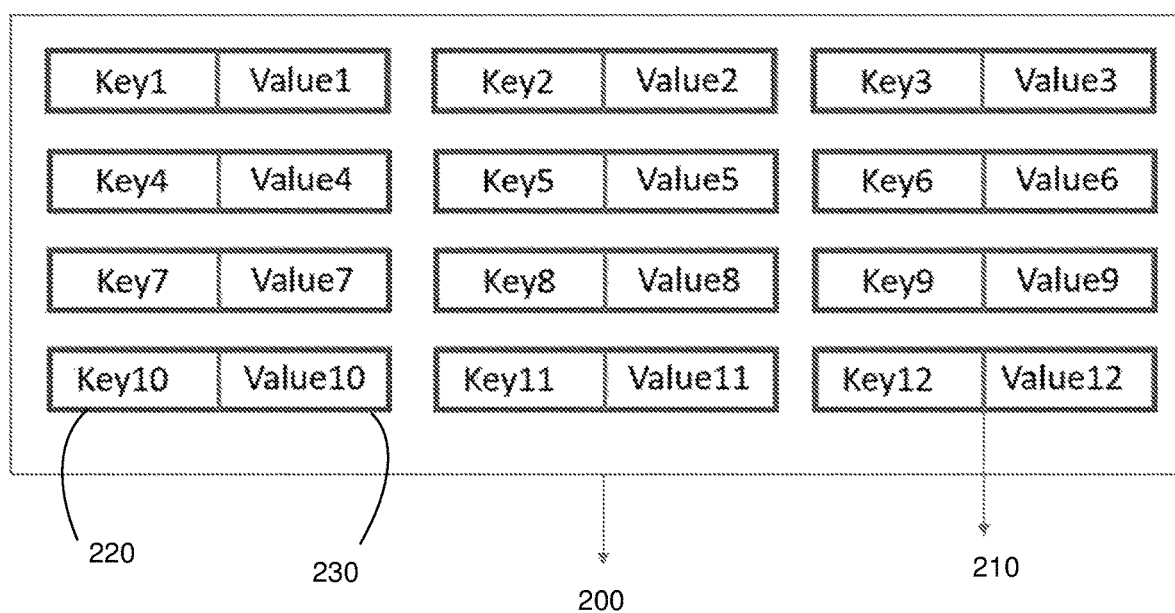
FIG. 2 shows a generic scheme of a packet, according to an embodiment.

FIG. 2 shows a generic scheme of a packet 200. As indicated by the arrows, the entire block is the packet 200, which consists of a sequence of information elements 210. In an example embodiment, the sample packet contains twelve information elements 210. In the example embodiment, each information element includes a tuple, the tuple including a "key" 220 and a "value," 230 where the key 220 is the information element's name, and the value 230 is the content of the information element 210 in the specific packet 200.

In an example embodiment, the "key" may be "message code" and the "value" may be "32." In an example embodiment, specific message codes may indicate a packet's purpose. In an example embodiment, 32 in the GTP protocol may stand for "create session request message." As described, the components illustrated in the drawing may be viewed as language building blocks. In an embodiment, the packet in the drawing may be the "sentence," while the sequence of information elements may be a sequence of "words." In an embodiment, each information element may be used as an entity. In an embodiment, only the keys may be used as an entity.

Figure 3:
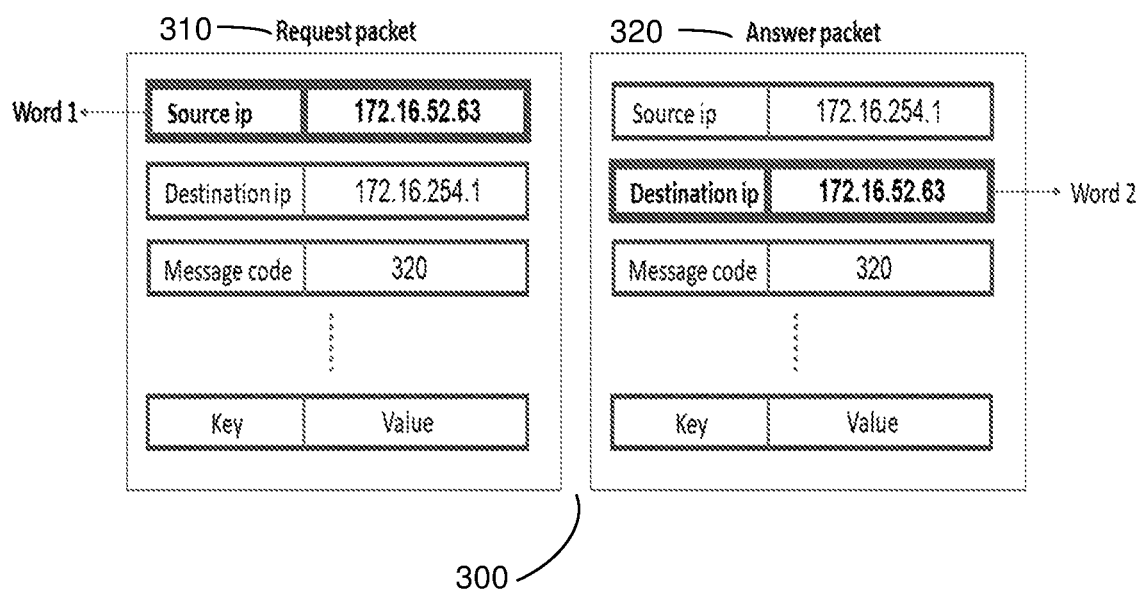
FIG. 3 shows an illustration of two packets, including a request packet and a response packet, according to an embodiment.

FIG. 3 shows an illustration of two packets 300 including a request packet 310 and a response packet 320. In an example embodiment, some information elements are explicitly described.

In the example embodiment, a data sample includes the pair (word 1, word 2). In the example embodiment, based on the information elements, an analysis based on a large data set of packets similar to those shown may yield the rule: "given that the request packet has an information element with a key called "source IP" and the value "172.16.52.63," it is with a probability of 1 that the answer packet will have an information element with a key called "destination IP" and the same value "172.16.52.63"." In the example embodiment, where such results present for any value X (that is, the above conditional probability applies for any IP address), it may be shown that the rule can be improved to have a generic formulation, that the source IP of the request packet always equals the destination IP of its corresponding answer packet.

Figure 4:
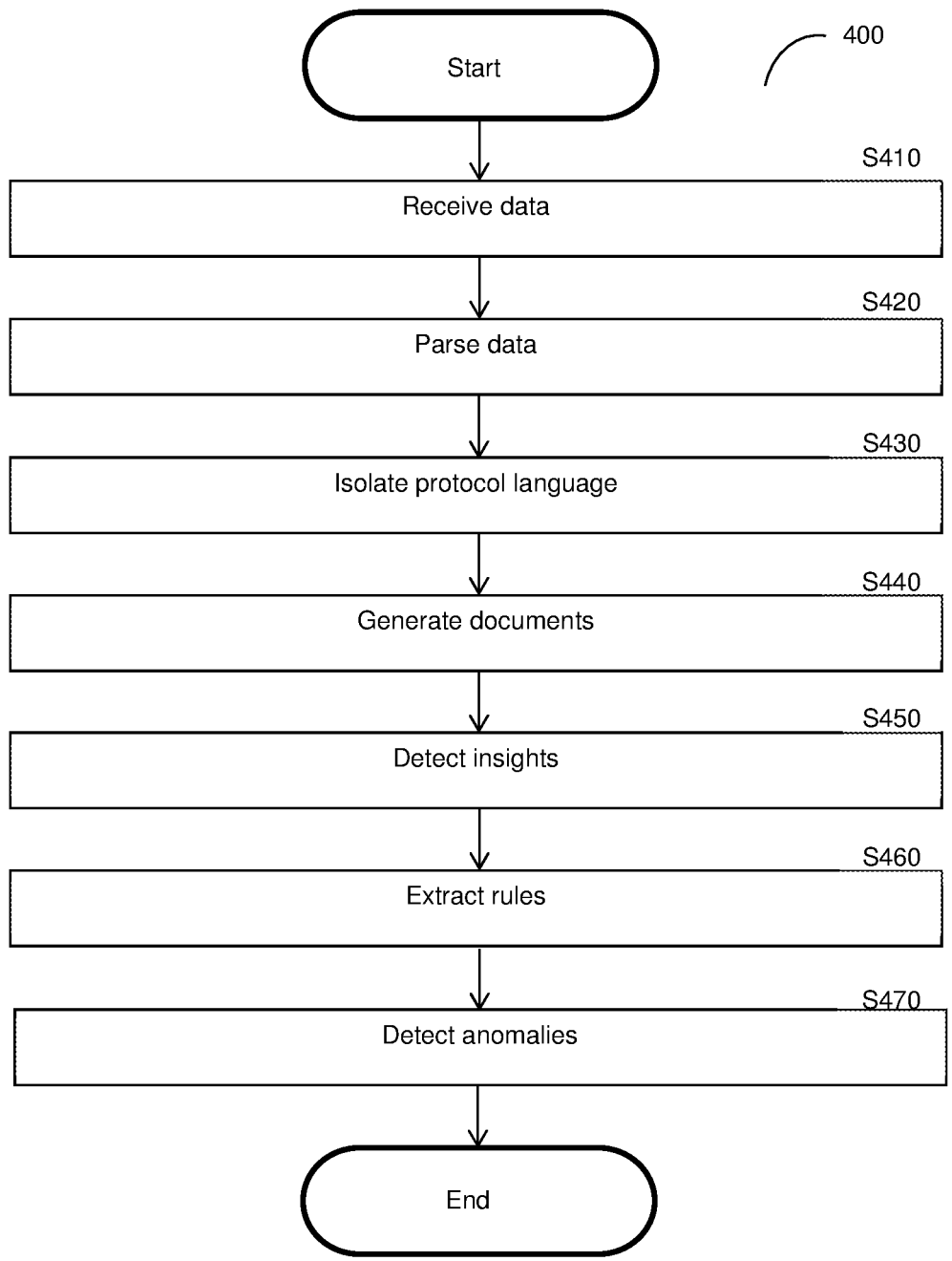
FIG. 4 is a flowchart illustrating a process of generating anomaly-detection rules from received data using word representation methods, according to an embodiment.

FIG. 4 is an example flowchart 400 illustrating a method of generating anomaly-detection rules, according to an embodiment.

At S410, at least one data set is received. The received data set may be, without limitation, packets, messages, or other data units containing at least one information element. The received data may be a part of a communication procedure and may identify one or more users or user devices. Furthermore, the received data may be a part of a communication protocol.

In an example, the received data may be a packet containing key-value information element pairs. Of the key-value information element pairs contained in the received data packet, one information element may contain an identifier describing a specific user or user device. In the example embodiment, the received data packet may be a packet dispatched in a wireless communication procedure, such as a TCP handshake. Furthermore, in the example embodiment, the received data packet may be a part of a communication protocol, such as TCP/IP.

At S420, the received data is parsed into a network language, consisting of elements paralleling a natural language. Specifically, the received data may be parsed into words, sentences, paragraphs, and the like, language features for which NLP techniques are established. The parsing of received data into an NLP-ready body of language may include the specification of certain types a of data as equivalents of words, sentences, paragraphs, documents, and the like. The parsing of received data into an NLP-ready body of language may include the parsing of information elements as words, the parsing of packets or messages as sentences, and the parsing of data exchanges within a procedure as paragraphs.

In an example embodiment, the parsing of data into NLP-ready bodies of language may be applied to data received in a mobile network. In the example, the individual messages within the mobile network may be viewed as the "sentences" of the "network language," while the information elements comprising the messages may be viewed as "words." While the individual information elements may include multiple sub-elements, such as a key and a value, the combination of the sub-elements into the singular information element may be viewed as the "word" in the network language. In the example, the messages transmitted within the mobile network, viewed as "sentences," may contain one or more information elements, viewed as "words."

In addition, in the example embodiment, messages exchanged within a mobile network may correspond with one or more procedures. For example, the mobile network may include a predefined procedure called "Create Session" which allows a user to initiate a voice call session with another user. The predefined "Create Session" procedure may include one or more messages, exchanged in sequence, describing session-relevant parameters such as, without limitation, users, user device identifications, message data contents, and the like. In the network language equivalence model, messages exchanged within a procedure may comprise a paragraph. Within the paragraph, messages, viewed as "sentences" may be arranged according to various factors including, without limitation, timestamps, predefined message-exchange sequences, and the like.

In an example, the parsing of network data into NLP-ready bodies may be illustrated with respect to telecommunication networks. Telecommunication networks are characterized by machine to machine communication according to predefined protocols. The machines communicate with each other by passing messages. Those messages are transmitted over network packets. In certain instances, a packet transmitted over the network contains a single message, and, in other cases, a packet contains several messages. As an example (and without limiting the scope of the invention) in a mobile network, there is a predefined procedure called Create Session. This procedure enables a session creation for a user (subscriber) who wants to generate a voice call or a data session. Thus, the entire communication in a telecom network is governed (without limiting the scope of this invention) by a set of well-defined messages, procedures and sessions in each protocol. Those can be viewed as a language by which the different elements in a telecom network are communicating with each other. We denote such a language as a Network Language. The words of this language are denoted as messages' information elements (or, briefly, information elements), the sentences are packets or messages and the paragraphs are procedures or sessions. Different communication protocols are viewed as different languages.

It should be emphasized that the correspondence presented above between information elements, packets, and procedures to words, sentences, and paragraphs, is just one possible representation of the Network Language. There are other ways to create a Network Language. For example, there are cases where we might want to detect anomalies based on joint multi-protocol analysis. In such cases those protocols together as a unified entity, will be part of the same Network Language.

At S430, the protocol language is isolated. The protocol language may be equated with the language in which a body of natural-language text is written. The language isolated may be a network language constructed from pre-defined messages, sessions, and procedures used in a given communication protocol. In an example, the network of interest may be a mobile network and the communications within the mobile network may be governed by a set of pre-defined messages, procedures, and sessions specific to the protocol, which may be viewed as the "language" in which the participants in the mobile network communicate.

The isolation of the protocol language may allow for the extraction of insights from the "documents" generated at S440, in subsequent procedures, in light of the protocol language isolated. The isolation of the protocol language may be achieved by analysis of the data parsed at S420, review of pre-defined protocol manuals, research papers, and the like, similar methods, and any combination thereof.

At S440, "documents," or sets of "words," "sentences," and "paragraphs" related to a unique identifier, are generated based on the data received at S410 and parsed at S420. In addition to equivalents to words, sentences, and paragraphs, the messages exchanged concerning a user may be, at the document generation phase S440, consolidated and parsed as a single "document" in the network language model. In an example, every message exchanged to or from a user may include an information element containing the user's unique ID.

At the document generation phase S440, the messages containing the user's unique ID may be appended to a "document" specific to the user identified. The organization of "words," "sentences," or "paragraphs" within the "document" may be achieved by consideration of factors including, without limitation, message timestamps, pre-defined message ordering sequences, message contents, and the like. Messages between users may appear in "documents" relating to multiple users, and the overlaps between "documents" may be maintained without deviating from the scope of the described embodiments. The documents generated by the document generation process at S440 may serve as the information corpus, which may serve as data inputs for algorithms subsequently applied.

It may be noted that the protocol language isolation phase S430 and the document generation phase S440 may occur one before the other, in any order, or may occur concurrently, with no loss of generality or departure from the scope of the embodiments described.

At S450, insights are detected in the documents generated at S440. The detection of insights may be achieved through a variety of techniques including word representation, other similar techniques, and a combination thereof. The insights detected at S450 may be subsequently applied to the generation of rules and the detection of anomalies.

The detection of insights at S450 may be achieved using word representation. The primary aim of the word representation technique is mapping words from a natural language into low-dimensional vectors, such that a word is generally represented as a point in a vector space. Word representation implementations are often based on the hypothesis that words in similar contexts may have similar meanings. The application of word representation to network languages may allow for the detection of insights and the subsequent extraction of rules and identification of anomalies.

Word representation relies on the representation of documents, paragraphs, sentences, or strings of text as vectors, where the individual vectors include component dimensions. As the component dimensions may represent descriptions of the vector in various aspects, each dimension corresponds with a separate term. Where a component word, sentence, or the like, appears in the represented document, paragraph, sentence, or string of text, the component's value within the vector is non-zero. Where words are chosen as the component dimensions of the vector, the dimensionality of the vector is equal to the number of distinct words occurring in the corpus.

Representation in low-dimensionality vectors allows for a simplification of the vector into a form where only those components necessary to describe the vector are included. Representation as a low-dimensionality vector allows for lower processing requirements for vector-to-vector comparisons, allowing for higher processing speed, volume, or both, when modeling data in vector form.

In an embodiment, several information elements that appear in a certain communication protocol may be grouped together based on analysis of the word vectors. The grouping is performed based on some semantic logic. More specifically, like in natural language, where words can be gathered into groups, like food (apple, pizza, etc.) or cities (Paris, London, etc.), a similar grouping process can be performed on the information elements appearing in a Network Language. For example and without limiting the scope of the invention, applying such a grouping process to the data of the Diameter protocol, yields a grouping of Information elements that are related to the Access Point Name profile, where Access Point Name is the name of the network a subscriber is connecting to, and may be the private or the public internet.

In a further embodiment, word representation learning may be achieved through the use of Neural Networks. This approach is known as Word Embedding since it embeds an entire vocabulary into a relatively low dimensional space, whose dimensions are latent continuous features. The embedding of words is learned automatically by various training methods and subject to a target function that should be optimized using mathematical optimization algorithms.

The principle of most of the objective functions that span different embedding methods is to optimize the word vector representations of a specific (target) word and its relevant context words: the words that surround this target word. As an illustrative example, consider the sentence "do not be afraid good boy". We choose the word 'good' as the target word and consider its immediate neighboring words from left (the word 'afraid') and from right (the word 'boy'). During the word representation learning procedure, the word representation of the target word and the context words as points in the representation space, are updated, to maximize the probability of observing the context words given the target word. This learning procedure yields groups of words which bear some semantic similarity, and whose corresponding learned word vectors are nearby in the learned vector space, in terms of the Euclidean distance between them. For example, words like "afraid," "sad," and "scared" are expected to be close one to the other. Thus, the goal of the training task is to learn word vector representations that are 'good' at predicting the nearby words given some target word, where nearby words are words that appear in some fixed window-size of words apart from the target word. In the illustrative example, the words 'afraid' and 'boy' in the above illustrative example are one word apart from the target word 'good'.

Additionally, in an embodiment, Word Embedding models may be constructed based on several aspects of representation choice including, without limitation, content, contextual order between packets and messages, pairings, concatenation, chronological ordering, and the like.

Word embedding models may be constructed based on content, where either each information element may be used as a word, considering, as an example, the tuple [key, value] as a word. Alternately, only the keys of each information element may be taken for the representation.

Order or context may also be used to construct Word Embedding models, where, as an example, the packets can be ordered in different manners, based on their relation to each other.

In an example, pairs of request packets and corresponding response packets may form the basis of a Word Embedding model. Likewise, the concatenation of packets which are a part of the same session (for example request1 that triggers request2 in a different interface) may achieve the same formation of a basis for a Word Embedding model, as may the use of the ordering of packets based on chronological order.

Domain-specific knowledge may be used to create the input words, using words with certain information element key properties, such as consecutive numbering of their attribute codes, or information elements that are nested within another information element and have hierarchical properties between them.

The application of NLP word representation models allows for the detection of insights at S450. The insights detected may be complete, semi-complete, or incomplete insights regarding information elements, messages, packets, procedures, protocols, and the like. The insights detected may describe patterns occurring in the data analyzed and may include observations which could not be detected except with NLP techniques. The insights detected may be applicable to the generation of rules and the detection of anomalies at subsequent steps.

At S460, rules may be extracted from the insights detected at S450. The rules extracted at S460 may be one or more complete or semi-complete rules describing, either individually or in combination, the behaviors and patterns identified in the data received at S410. The extracted rules may be applicable to the subsequent detection of anomalies.

In an example embodiment, at S460, rules regarding communications in a mission critical network may be extracted from the insights detected at S450. Where the detection of insights at S450 indicates a high likelihood that a response packet containing an "acknowledge" response information element follows a request packet containing a "synchronize" request, a rule may be extracted that a packet containing an "acknowledge" response information element must follow a packet containing a "synchronize" request information element.

In a further example embodiment, at S460, rules regarding communications in a mission-critical network may be extracted from the insights detected at S450, where the insights detected at S450 are detected by analysis of word representation mappings. Where word representation mapping indicates a semantic similarity between two words or information elements, the similar words or elements might be expected to occur in similar contexts. In an example, a noted semantic similarity between certain co-occurring information element keys, such as "source IP" and "destination IP," in combination with an observation that one information element key, such as "source IP," occurs in each received packet, may enable detection of an insight that a second information element key, such as "destination key," must occur in each packet received. Although the "source IP" and "destination IP" information element keys contain different values and refer to different points in a network, the strong semantic similarity between the two, arising from inclusion of both in all packets received, allows for the co-location of the two keys within an information element key mapping space, and the detection of an insight that the keys specified are mandatory keys.

At S470, the rules extracted at S460 may be applied to the detection of anomalies. Anomalies may be detected in real-time or in the analysis of logged communication. Detection of anomalies may indicate the presence of malicious or abnormal activity. In an embodiment, the detection of anomalies at S470 may trigger the initiation of at least one response action, where a response action may include, without limitation, displaying an alert to a user/administrator, quarantining devices, resources, and processes related to the detected anomaly, passing anomalous traffic through a scrubbing center, and like techniques.

In an example, where a rule is extracted at S470 that a packet containing an information element "a" must follow a packet containing an information element "b," that rule may be applied to the detection of anomalies at S470. In the example, where a packet with an information element "b" follows a packet with an information element "c," an anomaly may be detected according to the rule extracted above. In an embodiment, the anomaly may be detected in real-time, by interception methods involving analysis of packets-in-motion. In a further embodiment, the anomaly may be detected upon analysis of a block of data entries, the block of data entries containing records of the anomalous transaction.

In a further example, where a rule is extracted at S470 based on, in the example above, the detection of insights via word representation analysis, the same may be applied to the detection of anomalies. As above, where the rule extracted at S470 specifies that "source IP" and "destination IP" are mandatory keys to be included in every packet received, an anomaly may be detected where a packet is received that does not include "source IP," does not include "destination IP, or includes neither.

Figure 5:
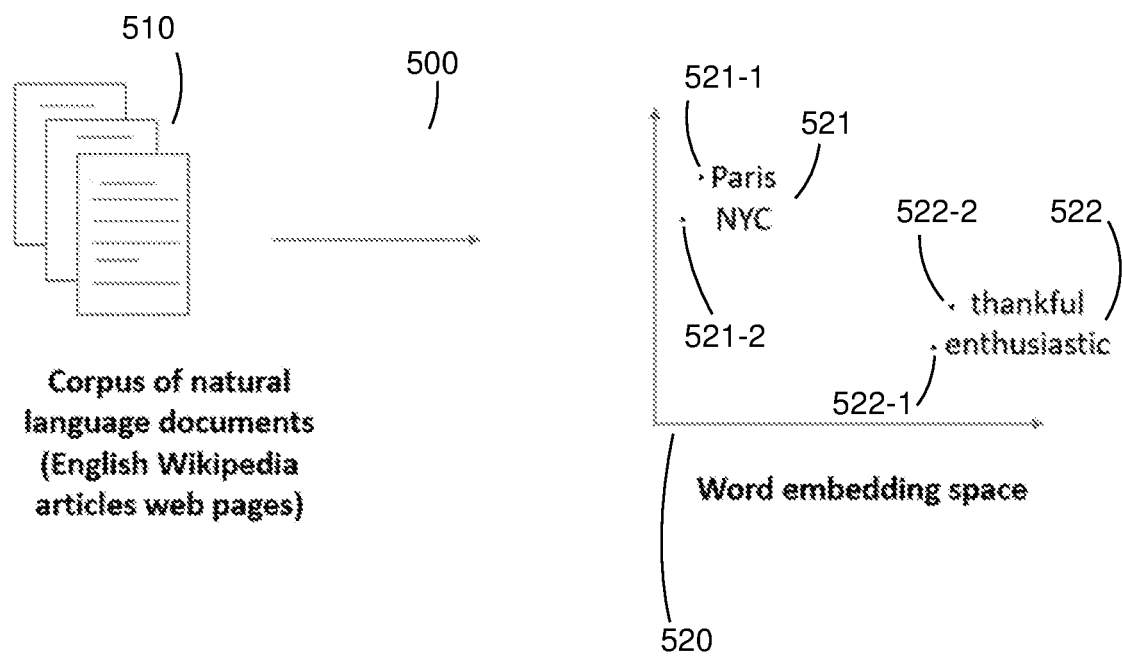
FIG. 5 illustrates word representation learned on a natural language corpus, according to an embodiment.

FIG. 5 illustrates word representation 500 learned on a natural language corpus 510, according to an embodiment. In the example depiction, the representation of the elements of the natural language corpus 510 results in the capture of clusters, 521 and 522, of semantically-similar words, relating "Paris" 521-2 and "NYC" 521-1 as well as "thankful" 522-2 and "enthusiastic," 522-1 in the word representation space 520.

Figure 6:
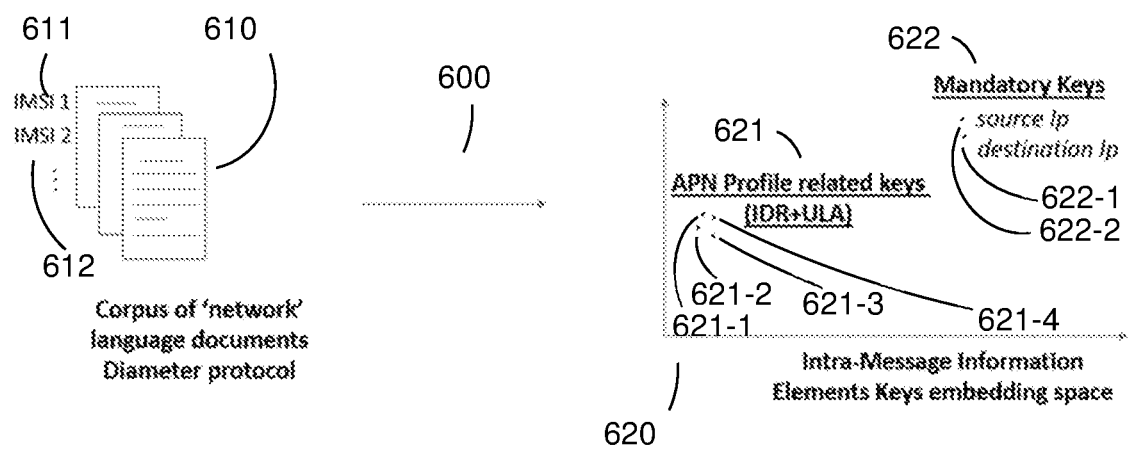
FIG. 6 illustrates word representation learned on a network language corpus created from diameter protocol network data, where the target and context words are constructed from the information element keys of a single message (intra-message), according to an embodiment.

FIG. 6 illustrates word representation 600 learned on a network language corpus 610 created from diameter protocol network data, where the target and context words are constructed from the information element keys of a single message (intra-message), according to an embodiment. In the example depiction, illustrating word representation designated as "intra-message," both the target word and the context words are constructed from the information elements in a specific message. The word representation resulting from the "intra-message" method yields a cluster, 621 and 622, of information element keys that are related in some manner, as depicted within an intra-message information elements keys hyperspace 620. In the example embodiment, the corpus of network language documents 610 includes multiple documents, designated with separate IMSI numbers, i.e., IMSI1 611 and IMSI2 612. In an alternate embodiment, the corpus 610 may include one or more documents.

Applying the intra-message word embedding method requires the training of a model to embed the "words" provided. The training process of the neural network is done with respect to the following probabilistic question: given that a certain key was observed in a message, what is a 'good' word representation, in a sense that based on this representation we predict other keys appearing in that message as well, with high accuracy?

As an example, analysis of the Euclidean properties of the representation learnt on a Diameter protocol network data, results in the following observation: using words as information element keys yields a cluster of Information element keys that are related in some manner.

In an example embodiment, keys that must appear in every message are regarded as mandatory keys 622, such as the source IP (who sent the message) 622-2 and the destination IP (to whom the message was sent) 622-1 that must appear in every message. In the learned hyperspace, the associated word vectors are close together.

Figure 7:
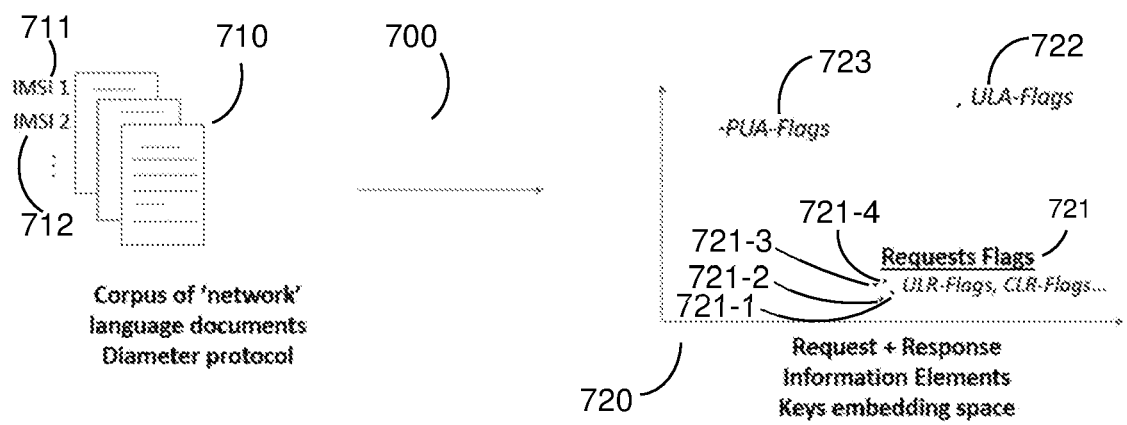
FIG. 7 illustrates word representation learned on a network language corpus created from the diameter protocol network data, where the target word is an information element key from a request message and the context words are information element keys in the corresponding response message, according to an embodiment.

Furthermore, in the example, a second cluster 621 is observed containing different keys 621-1 through 621-4, each of which relates to the APN profile in an Insert Subscriber Data Request message and an Update Location Answer message. In the example, Insert Subscriber Data Request message sends the subscriber's profile information in the request to the MME, while Update Location Answer message fetches this information from the HSS by the MME. The contextual similarity between these keys is captured during the representation process FIG. 7 illustrates word representation 700 learned on a network language corpus 710 created from the diameter protocol network data, where the target word is an information element key from a request message and the context words are information element keys in the corresponding response message, according to an embodiment. For a given key from a request message, the representation of the corresponding response keys will be organized. In the example embodiment, the corpus 710 includes multiple documents, designated with IMSI1 711 and IMSI2 712.

In the example, the target word is taken to be an information element key from a request message, and the context words are taken to be information element keys from the corresponding response message. The resulting word mapping to the request+response information elements keys hyperspace 720 yields a cluster 721 of all the request messages' flag keys 721-1 through 721-4, such as Update Location Request Flags (ULR-Flags) and Cancel Location Request Flags (CLR-Flags), where the response message flags, such as Purge UE Answer Flags (PUA-Flags) 723 and Update Location Answer Flags (ULA-Flags) 722 are found in two different positions in the learned hyperspace. The semantic similarities and differences between the above keys are captured during the learning process. The depicted proximity of the request Flags is not captured in the mapping learned in the intra-message representation setup.

Figure 8:
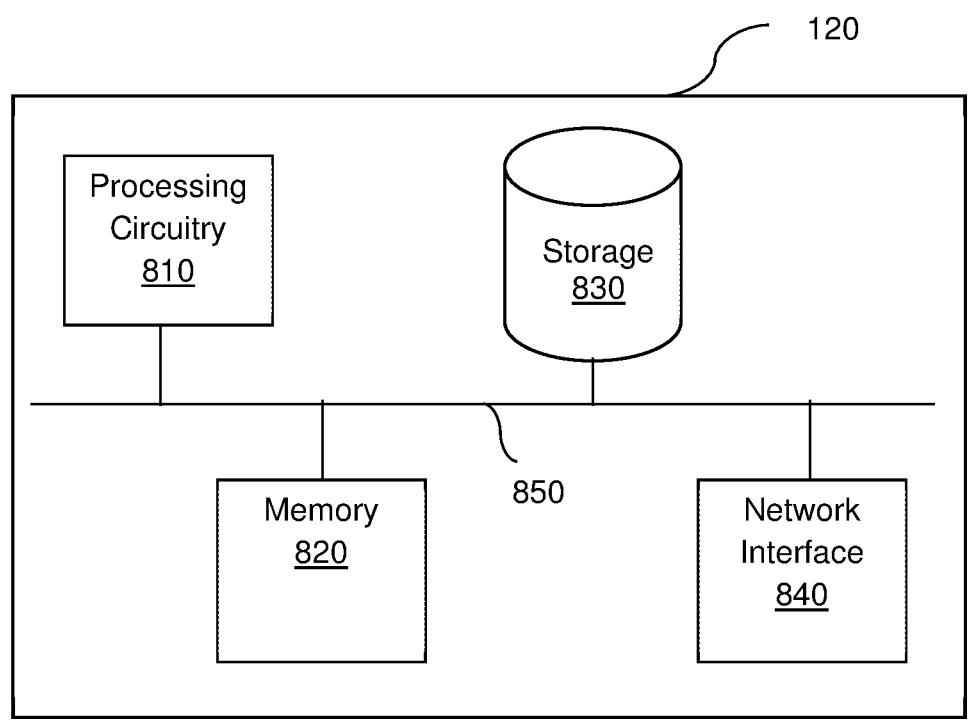
FIG. 8 is an example schematic diagram of a system, according to an embodiment.

FIG. 8 is an example schematic diagram of an analytic system 120 according to an embodiment. The analytic system 120 includes a processing circuitry 810 coupled to a memory 820, a storage 830, and a network interface 640. In an embodiment, the components of the analytic system 120 may be communicatively connected via a bus 850.

The processing circuitry 810 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The memory 820 may be volatile (e.g., RAM, etc.), non-volatile (e.g., ROM, flash memory, etc.), or a combination thereof. In one configuration, computer readable instructions to implement one or more embodiments disclosed herein may be stored in the storage 630.

In another embodiment, the memory 820 is configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 810, cause the processing circuitry 810 to perform the various processes described herein.

The storage 830 may be magnetic storage, optical storage, and the like, and may be realized, for example, as flash memory or other memory technology, CD-ROM, Digital Versatile Disks (DVDs), or any other medium which can be used to store the desired information.

The network interface 840 allows the analytic system 120 to communicate with the other elements for the purpose of, for example, receiving data, sending data, and the like. Further, the network interface 840 allows the analytic system 120 to communicate with the machines 110 for the purpose of collecting data.

It should be understood that the embodiments described herein are not limited to the specific architecture illustrated in FIG. 8, and other architectures may be equally used without departing from the scope of the disclosed embodiments.

It may be noted that the implementations, embodiments, and the like described above may be applicable to APIs, API communications, and other aspects of API implementation without departing from the scope of the disclosed. In an embodiment, the methods, techniques, and the like described may be applied to detection of anomalous business logic behaviors in an API-driven exchange, rather than the detection of anomalous communications within a communication protocol. In such an embodiment, the detection of anomalous business logic behaviors may be applicable to any API protocol, including domain-specific protocols such as diameter protocols, and web API protocols, such as REST/JSON.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for detecting anomalies in mission-critical environments using word representation learning, comprising:
   parsing at least one received data set into a text structure;
   isolating a protocol language of the at least one received data set, wherein:
      the protocol language is a standardized pattern for communication over at least one communication protocol, and
      isolating comprises analyzing the text structure to determine a network language constructed from at least one of messages, sessions, and procedures in the at least one received data set;
   generating at least one document, in the protocol language, from contents of the at least one received data set, wherein the at least one document includes at least one parsed text structure referencing a unique identifier;
   detecting, using a trained word representation learning model and in light of the protocol language isolated, insights in the at least one document, wherein:
      the insights are detected in at least one representation having at least one dimension,
      the at least one representation is mapped to at least one learned hyperspace, and
      the insights describe patterns occurring in the at least one document;
   extracting rules from the insights; and
   detecting anomalies by applying the rules on patterns for communication over at least one communication protocol.

2. The method of claim 1, wherein isolating the protocol language of the at least one received data set and generating the at least one document from the contents of the at least one received data set occur substantially simultaneously.

3. The method of claim 1, wherein detecting insights in the at least one document further comprises:
   applying a natural language processing (NLP) technique to the at least one document.

4. The method of claim 3, wherein the at least one representation includes a vector representation of at least one information element.

5. The method of claim 1, wherein the at least one received data set includes any one of: machine-to-machine communications and application programming interface (API) communications.

6. The method of claim 5, wherein parsing the at least one received data set further comprises:
   parsing the at least one received data set as any one of: sentences, words, information elements, data units, and parsing procedures or sequences involving data packets or messages as paragraphs, wherein paragraphs contain sentences and sentences contain words.

7. The method of claim 1, wherein isolating the protocol language of the at least one received data set further comprises:
   identifying pre-defined messages, procedures, and sessions for a protocol.

8. The method of claim 1, wherein generating the at least one document further comprises:
   identifying unique identifiers in the at least one received data set; and
   creating separate documents containing records relating to each identified unique identifier.

9. The method of claim 1, wherein the at least one learned hyperspace is a depiction of the at least one representation, and wherein semantic similarity between the at least one representation is determined by proximity within the at least one learned hyperspace.

10. A non-transitory computer readable medium having stored thereon instructions for causing a processing circuitry to execute a process for detecting anomalies in mission-critical environments using word representation learning, the process comprising:
parsing at least one received data set into a text structure;
isolating a protocol language of the at least one received data set, wherein:
the protocol language is a standardized pattern for communication over at least one communication protocol, and
isolating comprises analyzing the text structure to determine a network language constructed from at least one of messages, sessions, and procedures in the at least one received data set;
generating at least one document, in the protocol language, from contents of the at least one received data set, wherein the at least one document includes at least one parsed text structure referencing a unique identifier;
detecting, using a trained word representation learning model and in light of the protocol language isolated, insights in the at least one document, wherein:
the insights are detected in at least one representation having at least one dimension,
the at least one representation is mapped to at least one learned hyperspace, and
the insights describe patterns occurring in the at least one document;
extracting rules from the insights; and
detecting anomalies by applying the rules on patterns for communication over at least one communication protocol.

11. A system for detecting anomalies in mission-critical environments using word representation learning, comprising:
a processing circuitry; and
a memory, the memory containing instructions that, when executed by the processing circuitry, configure the system to:
parse at least one received data set into a text structure;
isolate a protocol language of the at least one received data set, wherein:
the protocol language is a standardized pattern for communication over at least one communication protocol, and
isolating comprises analyzing the text structure to determine a network language constructed from at least one of messages, sessions, and procedures in the at least one received data set;
generate at least one document, in the protocol language, from contents of the at least one received data set, wherein the at least one document includes at least one parsed text structure referencing a unique identifier;
detect, using a trained word representation learning model and in light of the protocol language isolated, insights in the at least one document, wherein:
the insights are detected in at least one representation having at least one dimension,
the at least one representation is mapped to at least one learned hyperspace, and
the insights describe patterns occurring in the at least one document;
extract rules from the insights; and
detect anomalies by applying the rules on patterns for communication over at least one communication protocol.

12. The system of claim 11, wherein the system is configured to:
generate the at least one document from the contents of the at least one received data set and to isolate a protocol language of the at least one received data set, substantially simultaneously.

13. They system of claim 11, wherein the system is configured to:
apply a natural language processing (NLP) technique to the at least one document.

14. The system of claim 13, wherein the at least one representation includes a vector representation of least one information element.

15. The system of claim 11, wherein the at least one received data set includes any one of: machine-to-machine communications and application programming interface (API) communications.

16. The system of claim 15, wherein the system is configured to:
parse the at least one received data set as any one of: sentences, words, information elements, data units, and parsing procedures or sequences involving data packets or messages as paragraphs, wherein paragraphs contain sentences and sentences contain words.

17. The system of claim 11, wherein the system is configured to:
identify pre-defined messages, procedures, and sessions for a protocol.

18. The system of claim 11, wherein the system is further configured to:
identify unique identifiers in the at least one received data set; and
create separate documents containing records relating to each identified unique identifier.

19. The system of claim 11, wherein the at least one learned hyperspace is a depiction of the at least one representation, and wherein semantic similarity between the at least one representation is determined by proximity within the at least one learned hyperspace.

* * * * *